H. T. BEAM.
Plow.
No. 80,118.
Patented July 21, 1868.
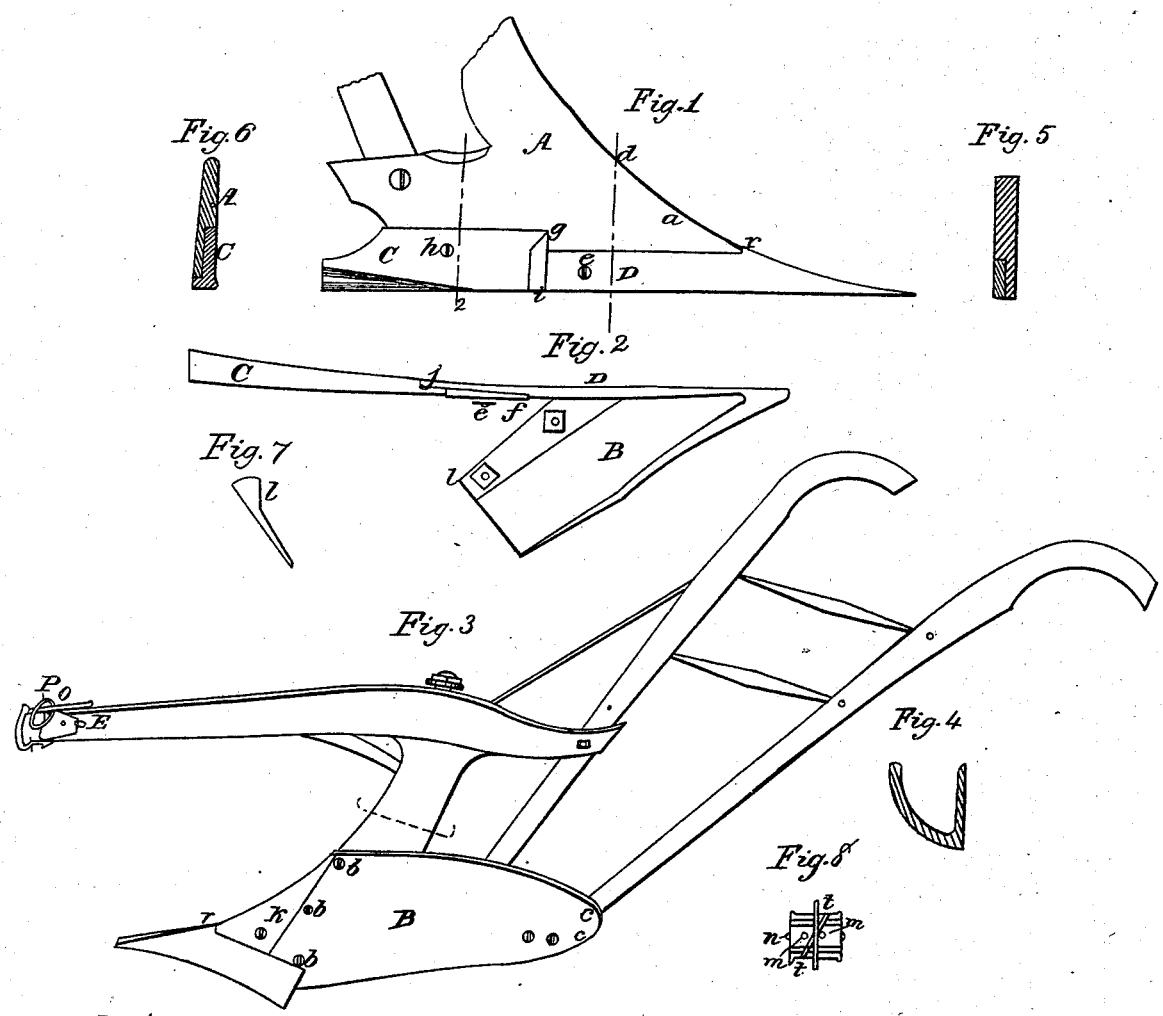

UNITED STATES PATENT OFFICE.

HENRY T. BEAM, OF PALESTINE, ILLINOIS.

IMPROVEMENT IN PLOWS.

Specification forming part of Letters Patent No. 80,118, dated July 21, 1868.

*To all whom it may concern:*

Be it known that I, HENRY T. BEAM, of Palestine, in the county of Crawford and State of Illinois, have invented a new and useful Improvement in Plows; and I do hereby declare that the following is a full, clear, and exact description thereof, reference being had to the accompanying drawings.

The nature of my invention consists in constructing the sheth or post of the plow of cast-iron, and so forming the same as to allow of the convenient attachment thereto of the mold-board, share, landside, beam, and handle, and at the same time allowing of the chilling of the same where it is most exposed to wear; and also in constructing the head on the front end of the beam of cast-iron, so that it can be so formed as to allow of any desired change from one side to the other of the point of draft, in order to give the plow greater or less land, and also to allow of a change of said point of draft vertically, so as to give the plow greater or less depth.

In order to enable others skilled in the art to which it appertains to make and use my invention, I describe it as follows:

I make the sheth or part A of my plow of cast-iron, and of any desired form, and the anterior part in front of the mold-board, which is the part most exposed to wear, I cast on a chill. This chilled part (shown at $a\ a$, Figs. 1 and 3) may be said to constitute the front or anterior part of the mold-board, and projects beyond that part on which the mold-board proper, B, is secured by about the thickness of said mold-board, so that when the latter is placed on it their surfaces will be about even. The sheth may be secured to the beam in any convenient way. The mold-board is secured to the sheth by screws, as seen at $b\ b$, and to the left handle by screws, as seen at $c\ c$. The sheth at its lower anterior part is formed with a scarf or offset, for the reception of the bar D, Figs. 1 and 2, of the share, as shown in Fig. 5, which is a cross-section at the dotted line $d$, Fig. 1. This bar is secured to the sheth at this scarf by screw $e$, Figs. 1 and 2. The lower end of the sheth is seen inside the bar of the share at $f$, Fig. 2. The sheth is also scarfed at its lower posterior for the reception of the landside C, Fig. 1, which is shown in Fig. 6, it being a section at dotted line 2 of Fig. 1. This scarf at its upper anterior part terminates in an acute angle, (shown at $g$, Fig. 1,) and the landside is made to fit therein, so as to support its forward end. It is screwed to the sheth, and also to the right handle, as shown at $h$, Fig. 1. A small part of the sheth extends to the bottom or lower edge of the bar of the share and landside, and between the two, as seen at $i$, Figs. 1 and 2. This landside C is cast-iron, and the part most exposed to wear is chilled. Its interior end passes over the scarf of the sheth, and being even or flush with it on the outside, while a small part of it at its lower edge passes behind the sheth, as seen at $j$, Fig. 2, for the purpose of securing it in its place. The share is attached to the sheth by screw $e$, Figs. 1 and 2, and by screw $k$, Figs. 2 and 3.

The share may be made in the ordinary way, except that at the rear of the horizontal part $l$, Fig. 2, is turned up a small triangular piece, $l$, as shown in Fig. 7, which is an end view of the part $l$ of Fig. 2, and which forms a support for the mold-board at that point, and that I weld a small triangular piece on the upper part of the said bar, as seen at $r$ in Figs. 1 and 3, the object of which is to protect the anterior point of the sheth, which, as will be seen, forms an acute angle, and being chilled would be, without this protection, liable to be broken off. I form a cast-iron head to the front end of the beam, as seen at E, Fig. 3. This head has two lugs or flanges, between which the end of the beam is placed, and a bolt passes through the three, as seen near E, Fig. 3, which secures the head to the beam. The front face of this head has three grooves formed therein, two of which are horizontal, and one diagonal, as shown, $t\ t\ t$, in Fig. 8. There are two pins or bolts projecting from the face of the head, one on each side of the diagonal groove, and both between the two horizontal grooves, as shown at $m$, in Fig. 8. Behind these bolts is placed a horizontal key, (shown at $n$, Fig. 8.) This key forces the said bolts forward and holds them there. I place the clevis $o$, Fig. 3, on the beam in such a manner as that it will just pass from side to side of the head freely when the bolts $m$ are forced back into the head, which is done by removing the key $n$; but when these bolts are held forward by the insertions of the key they hold the said clevis between them. In this clevis is placed the ring $p$, by which the plow is drawn.

In order to give the plow greater or less depth, the key $n$ is withdrawn and the bolts $m$ pressed back, when the ring can be easily removed from one of the horizontal grooves to the other, the clevis brought back between the bolts and the key inserted behind them, and thus the ring $p$ kept in the desired place.

Fig. 4 shows a section through the sheth at the dotted line in Fig. 3.

Having fully described my invention, what I claim as new, and desire to secure by Letters Patent, is—

1. The cast-iron sheth made as shown and described, with scarfs formed thereon for the reception of the bar of the share and the landside, as seen at C and D, Fig. 1, and the mold-board, as seen at Fig. 3, substantially as and for the purposes set forth and specified.

2. The share as constructed by turning up a small triangular piece to the anterior part thereof, as seen at Fig. 7, which is an end view of the share at $l$, Fig. 2, which piece forms a support for the mold-board B, and also welding on a small triangular piece on the top of the share, as seen at $r$, Figs. 1 and 3, which protects the anterior part of the sheth, substantially as and for the purposes shown and described.

3. The landside formed of the part D of the share and the cast-iron anterior part, C, all constructed and attached as shown in Figs. 1, 2, and 3, as described, and for the purpose specified.

4. The cast-iron head on the front end of the beam, with its pins $m$, key $n$, clevis $o$, and grooves $t$, all as shown and described, and for the purposes specified.

HENRY T. BEAM.

Witnesses:
 EBENEZER CONDIT,
 ENOCH GOGIN.